United States Patent

Redman

(12) United States Patent
(10) Patent No.: US 6,757,244 B1
(45) Date of Patent: Jun. 29, 2004

(54) COMMUNICATION BUS ARCHITECTURE FOR INTERCONNECTING DATA DEVICES USING SPACE AND TIME DIVISION MULTIPLEXING AND METHOD OF OPERATION

(75) Inventor: Mark D. Redman, Chandler, AZ (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/164,925

(22) Filed: Oct. 1, 1998

(51) Int. Cl.[7] .......................... G01R 31/08; H04L 12/50; H04J 3/17; H04B 7/212
(52) U.S. Cl. ...................... 370/227; 370/366; 370/434; 370/442; 710/100
(58) Field of Search ................................ 370/366, 216, 370/225, 227, 241, 242, 262, 268, 314, 357, 359, 369, 380, 389, 390, 352, 401, 402, 466, 434, 467, 412, 415, 419, 442, 407, 228, 451, 358; 714/2; 710/60, 117, 105, 305, 100

(56) References Cited

U.S. PATENT DOCUMENTS

| | | | | |
|---|---|---|---|---|
| 4,754,451 A | * | 6/1988 | Eng et al. ...................... 370/60 |
| 4,964,120 A | * | 10/1990 | Mostashari ................... 370/16 |
| 5,367,520 A | * | 11/1994 | Cordell ......................... 370/60 |
| 5,469,545 A | * | 11/1995 | Vanbuskirk et al. ... 395/200.01 |
| 5,734,695 A | * | 3/1998 | Seesing et al. ................ 379/9 |
| 6,292,491 B1 | * | 9/2001 | Sharper ....................... 370/412 |

* cited by examiner

Primary Examiner—Duc Ho (57) ABSTRACT

There is disclosed, for use in a communication device, such as an access concentrator, that performs high-speed data transfers between a group of M data drivers and a group of N data receivers, a space and time division multiplexing (STDM) bus interface in which each bus line is a single source/multidrop line that connects the output of only one driver to multiple receivers (i.e., a 1:N configuration). The disclosed invention minimizes the number of data reflections on each bus line by eliminating all but one of the stubs associated with the bus drivers. The disclosed device also eliminates a single point or failure situation. The bus interface also provides additional robustness by means of a "back-up" bus line that is coupled to alternate outputs on all data drivers and to inputs on all receivers (i.e., multisource/multidrop or M:N configuration).

17 Claims, 4 Drawing Sheets

COMMUNICATION BUS ARCHITECTURE FOR INTERCONNECTING DATA DEVICES USING SPACE AND TIME DIVISION MULTIPLEXING AND METHOD OF OPERATION

TECHNICAL FIELD OF THE INVENTION

The present invention is directed, in general, to data bus architectures and, more specifically, to a space and time division multiplexing bus architecture for interconnecting a group of data transmitting devices to a group of data receiving devices.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has greatly increased.

A consequential development related to the greater popularity of LANs has been the interconnection of remote LANs, computers, and other equipment into wide area networks (WANs) in order to make more resources available to users. This allows LANs to be used not only to transfer data files among processing nodes in, for example, a privately owned enterprise network, but it also allows LANs to be used to transfer voice and/or video signals in, for example, the public telephone network. However, a LAN backbone can transmit data between users at high bandwidth rates for only relatively short distances. In order to interconnect devices across large distances, different communication protocols have been developed, including X.25, ISDN, frame relay, and ATM, among others.

Most data transmissions, including file transfers and voice, occur in bursts at random intervals. The bursty nature of most data transmissions means that if the bandwidth allocated to a transmitting device is determined according to its peak demand, much bandwidth is wasted during the "silences" between data bursts. This variable bandwidth demand problem has been solved in part by X.25, frame relay and ATM, which use statistical multiplexing to improve the throughput of multiple users.

In order to allow dissimilar protocol devices, such as frame relay systems and ATM systems, and different speed data lines, such as T1 and T3, to communicate with one another, a host of well-known interfaces have been developed to interconnect the dissimilar devices. For example, frame relay-to-ATM interfaces have been developed that include a high-level data link control (HDLC) interface for sending and receiving frames to and from a frame relay-based network and a segmentation and reassembly (SAR) interface for sending and receiving cells to and from an ATM-based network.

It is therefore common to find networks containing a mixture of interconnected, diverse protocol devices, such as frame relay devices and ATM devices, communicating with one another via a high-speed backbone network. To increase the effective throughput of the backbone network, it is common practice to employ access concentrators (also called "concentrators," or "signal concentrators") at or near the periphery of a network to receive lower speed data transfers from a group of devices and/or sub-networks. A concentrator allows a large number of slower speed input circuits, such as T1 lines, to be connected to a smaller number of output circuits, such as other T1 lines or high speed T3 lines, by assuming that, under ordinary circumstances, not all of the input lines transmit simultaneously (i.e., statistical multiplexing).

Many concentrators and other communications devices, such as switches, routers, bridges, etc., contain interconnection circuitry designed to direct input signals received by a group of input port devices to a group of output devices, such as protocol processors or output processors. Frequently, the internal interconnection circuitry takes the form of a communications bus that receives signals from a variable number of line interface cards (i.e., multi-source) and directs the signals to a variable number of data processing/protocol processing engines. This allows any interface card output signal to be directed to any protocol processing engine input connector (i.e., "any driver to any receiver"). In concentrators (or other data communication devices) where the bus speed is relatively slow, this is an adequate interconnection architecture.

However, as the speed of the bus architecture becomes greater in order to accommodate higher bandwidth data, the existence of multiple drivers on the same bus line increases problems associated with signal reflections. Each source is connected to the bus line with a discontinuity stub that causes reflections. Additionally, since all of the drivers and receivers are physically coupled together, a failure that causes any driver output or receiver input to become stuck at either a Logic 1 level or Logic 0 level will cause a failure of the entire system.

There is therefore a need in the art for an improved bus architecture for use in a communication device that performs high-speed data transfers between a group of drivers and a group of receivers. In particular, there is a need for a bus architecture capable of performing high-speed data transfers between a group of drivers and a group of receivers that is not susceptible to signal reflections associated with multiple source stubs. There is a still further need for a robust bus architecture that is not as sensitive to single point failures and which provides alternate data paths for drivers upon failure of a primary data path.

SUMMARY OF THE INVENTION

To address the above-discussed deficiencies of the prior art, it is a primary object of the present invention to provide, for use in a communication device, such as an access concentrator, that performs high-speed data transfers between a group of M data drivers and a group of N data receivers, a space and time division multiplexing (STDM) bus interface in which each bus line is a single source/ multidrop line that connects the output of only one driver to multiple receivers. Thus, a separate bus line is provided to each data driver to send data to any data receiver (i.e., a 1:N configuration). This minimizes the number of data reflections on each bus line by eliminating all but one of the stubs associated with the bus drivers. This also eliminates single point of failure situations, since all of the bus drivers are now spatially separated serial data streams. In a preferred embodiment of the present invention, the bus interface provides additional robustness by means of a single "backup" bus line that is coupled to alternate outputs on all data drivers and to inputs on all receivers (i.e. multisource/ multidrop or M:N configuration).

According to one embodiment of the present, there is provided, for use in a data communications device, a data transfer system comprising: 1) a plurality of signal source drivers capable of transmitting data streams; 2) a plurality of signal receivers capable of receiving the transmitted data streams; and 3) an interconnection bus comprising a plurality of bus lines, each of the plurality of bus lines connecting a primary output of a selected one of the signal source drivers to signal inputs on selected ones of the plurality of signal receivers.

According to another embodiment of the present invention, the data transfer system further comprises an alternate bus line connecting a secondary output on each of the plurality of signal source drivers to inputs on each of the plurality of signal receivers.

According to still another embodiment of the present invention, each of the plurality of signal source drivers normally transmits a data stream from the primary output.

According to yet another embodiment of the present invention, each of the plurality of signal source drivers transmits the data stream from the secondary output upon a failure of the primary output.

According to a further embodiment of the present invention, the selected ones of the plurality of signal receivers comprise all of the plurality of signal receivers.

According to a still further embodiment of the present invention, the data streams are time division multiplex (TDM) signals.

According to a yet further embodiment of the present invention, the data communications device comprises a concentrator capable of receiving a plurality of data signals from a plurality of external devices and each of the plurality of signal source drivers combines selected ones of the plurality of data signals to produce a combined signal having a higher bit rate than the selected data signals.

According to still another embodiment of the present invention, each of the plurality of data signals combines the selected ones of the plurality of data signals using time division multiplexing techniques.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data communications device.

The following descriptions of the present invention discuss numerous telecommunications systems and circuits, such as access concentrators, T1 lines, T3 lines, and the like, and numerous telecommunications protocols, such as ATM, frame relay, time division multiplexing (TDM), and the like, that are well-known in the art. Additional details regarding these telecommunications protocols, systems and circuits are contained in "NEWTON'S TELECOM DICTIONARY," $14^{TH}$ edition, Flatiron Publishing, 1998. NEWTON'S TELECOM DICTIONARY is hereby incorporated by reference into the present disclosure as if fully set forth herein.

Additionally, the following descriptions disclose a specific embodiment in which a communications bus architecture in accordance with the principles of the present invention is incorporated into an access concentrator. Those skilled in the art will understand that this is by way of example only and should not be construed to limit the types of devices in which the present invention may be implemented.

Figure 1:
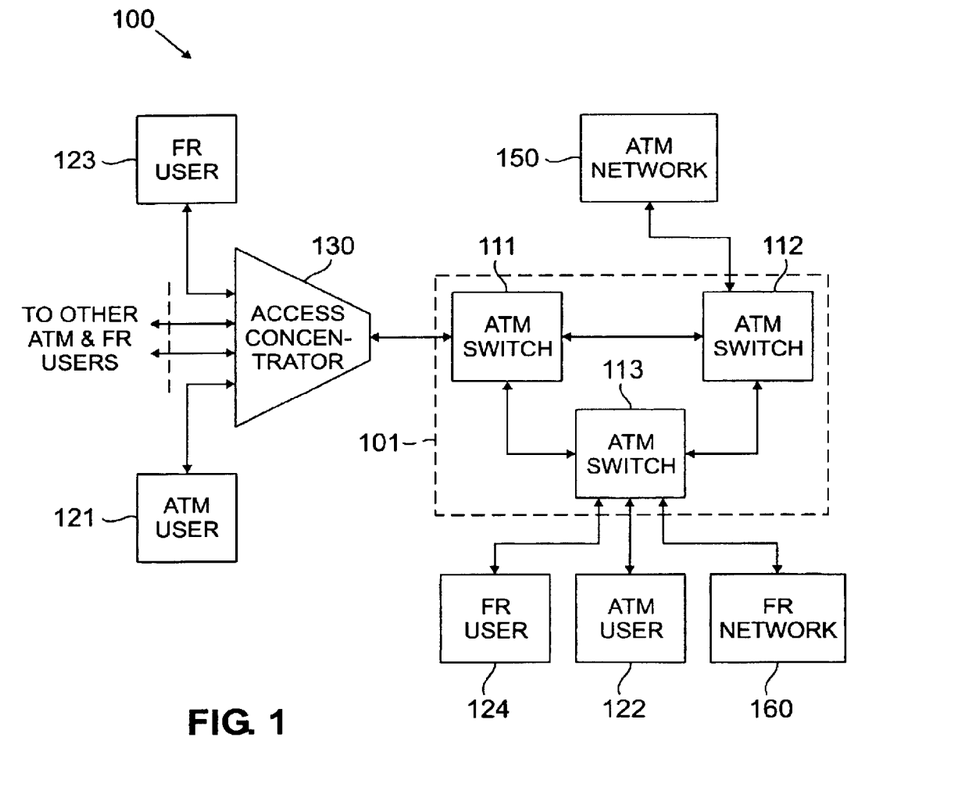
FIG. 1 illustrates an exemplary network infrastructure that interconnects a plurality of end users in accordance with one embodiment of the present invention.

FIG. 1 illustrates an exemplary network infrastructure 100 that interconnects a plurality of end users, including, for example frame relay end users and ATM end users, in accordance with one embodiment of the present invention. Network infrastructure 100 comprises an ATM backbone network 101 that provides switching connectivity between a plurality of devices, including ATM users 121 and 122, frame relay users 123 and 124, an external ATM network 150, and an external frame relay network 160. ATM users 121 and 122 each may comprise any device capable of sending and/or receiving ATM cells. Likewise, frame relay users 123 and 124 each may comprise any device capable of sending and/or receiving frame relay data frames.

In order to maximize use of the high capacity of ATM backbone network 101, access concentrator 130 is used to receive frame relay frames and ATM cells from a plurality of sources, including frame relay user 123 and ATM user 121. Access concentrator (AC) 130 comprises, among other things, frame relay-to-ATM interface circuitry that converts the received frame relay frames to ATM cells. These converted ATM cells and the ATM cells received from ATM devices are then multiplexed together, so that the output of access concentrator 130 comprises a comparatively high volume of tightly packed ATM cells. Thus, AC 130 ensures a high volume of ATM traffic is transmitted into ATM backbone network 101.

The communication lines connecting AC 130 to the frame relay users and ATM users, including frame relay (FR) user 123 and ATM user 120, typically comprise T1 and T3 lines. As is well known, a T1 lines is a digital transmission line with a capacity of up to 1.544 Mbps. The T1 circuit carries 24 voice signals, each one transmitting at 64 Kbps. An analog voice signal is sampled at a rate of 8000 times per second using pulse code modulation (PCM). Each sample comprises an 8 bit word, thereby creating an 8×8000=64 Kbps DS0 (digital service, level 0) building block. The 24 voice signals carried on the T1 are combined into a single bit stream by means of time division multiplexing (TDM). The TDM technique generates T1 frames comprising one sample (8 bits) from each of the 24 voice signals (or channels) plus one synchronization bit, referred to as a "framing bit". Thus, a T1 frame comprises (8×24)+1=193 bits. The T1 frames are generated at the sampling rate (8000 per second), thereby determining the T1 transmission rate 193×8000=1.544 Mbps. T3 lines are also well known. A T3 line carries 28 T1 lines plus some overhead data bits at a rate of 44.736 Mbps (typically, referred to as "45 Mbps").

Within access concentrator 130, the bits streams on the T1 and T3 input lines are "compacted" onto a lesser number of higher speed data lines, thereby maximizing use of the available ATM bandwidth on the output of AC 130. Thus, serial input data streams are received at different rates and in data bursts separated by time gaps in which no data are being transmitted, and are transmitted out of AC 130 at a single, higher speed bit stream containing fewer time gaps.

Figure 2:
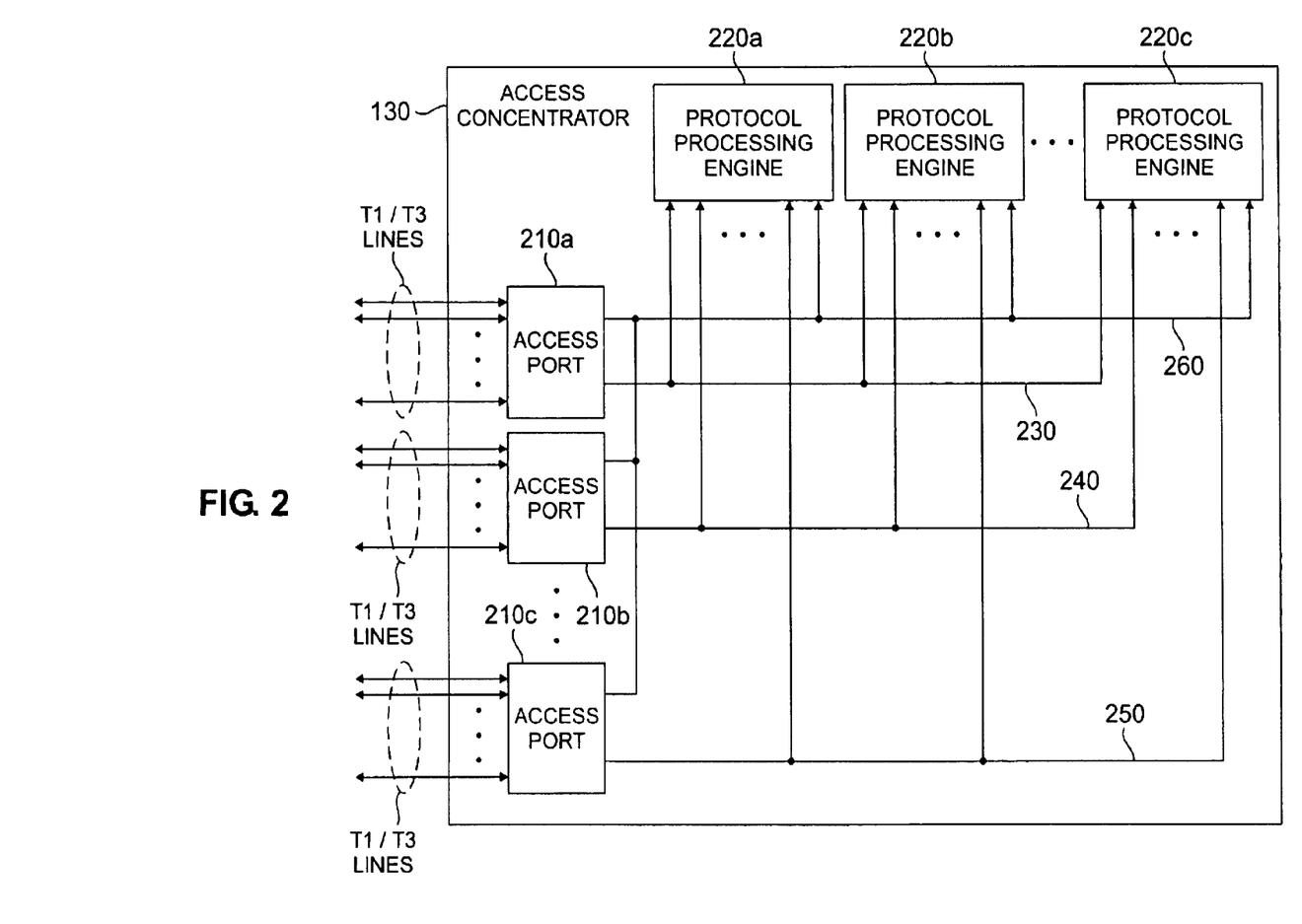
FIG. 2 illustrates an exemplary bus infrastructure within the exemplary access concentrator shown in FIG. 1 for interconnecting a plurality of data drivers with a plurality of data receivers in accordance with one embodiment of the present invention.

FIG. 2 illustrates an exemplary bus infrastructure 200 within exemplary access concentrator (AC) 130 for interconnecting a plurality of data drivers with a plurality of data receivers in accordance with one embodiment of the present invention. AC 130 comprises exemplary access ports 210*a*, 210*b*, and 210*c*, among others, and protocol processing engines (PPE) 220*a*, 220*b*, and 220*c*. Access ports 210*a–c* read serial input data streams from the input T1 and/or T3 lines, buffer the input data, and then transmit it at a higher rate to selected ones of PPE 220*a–c*. The data streams generated by access ports 210*a–c* contain appropriate addressing information to direct the data stream to the correct one of PPE 220*s–c*. PPE 220*a–c* convert the data received from access ports 210*a–c* from its original protocol format, such as frame relay, to the ATM protocol used in ATM backbone network 101. After protocol conversion is complete, PPE 220*a–c* relay the converted data to other processing modules (not shown) in access concentrator 130. The converted data is eventually sent to ATM backbone network 101 by AC 130. AC 130 also receives ATM data from ATM backbone network 101 and processes the received ATM data in the reverse direction using PPE 220*a–c*.

The bus architecture interconnecting access ports 210*a–c* and protocol processing engines 220*a–c* comprises a plurality of single source-multidrop DS3 equivalent bandwidth lines carrying serial streams of time division multiplexed (TDM) data. For example, bus line 230 is coupled to only one source, the primary data output of access port 210*a*, and to a plurality of destinations (or drops) on the inputs of some or all of the protocol processing engines in access concentrator 130. Similarly, bus line 240 is coupled to only one source, the primary data output of access port 210*b*, and to multiple destinations, namely, some or preferably all of the inputs of PPE 220*a–c*. Finally, bus line 250 is coupled to only one source, the primary data output of access port 210*c*, and to multiple destinations on the inputs of PPE 220*a–c*.

The above-described bus architecture provides single fault protection between the drivers (i.e., access ports 210*a–c*) and the receivers (PPE 220*a–c*) by using a 1:N (single source/multidrop) bus line on the output of each driver. Therefore, if a T3 bus line becomes stuck at a Logic 1 level or a Logic 0 level, the affected access port 210 and the corresponding T3 bus line will not prevent the remaining access ports and T3 bus lines from transmitting TDM data streams to the protocol processing engines. In this manner, the bus architecture provides both space and time division multiplexing (STDM) of serial data streams.

The bus architecture is made even more robust by means of "backup" bus line 260 that is coupled in a M:N configuration (i.e., multisource/multidrop) between access ports 210*a–c* and PPE 220*a–c*. Bus line 260 is coupled to the secondary data outputs of all drivers (i.e., access ports 210*a–c*) and to secondary data inputs on all receivers (i.e., PPE 220*a–c*). In the event of a failure of one of the primary 1:N bus lines, such as bus lines 230, 240 or 250, the access port coupled to the failed bus line switches over to backup bus line 260 in order to continue transmitting TDM data streams to the receivers.

Although backup bus line 260 is coupled to the stubs of all drivers and may therefore suffer from higher bit error rates caused by reflections, this is an acceptable tradeoff for the additional robustness provided by backup bus line 260. Backup bus line 260 is used only after a failure of one of the primary bus lines 230, 240 or 260, and is needed only until the faulty line driver card can be replaced. In a preferred embodiment of the present invention, the drivers, access ports 210*a–c*, may modify the transmission rate of the TDM data streams sent over backup bus line 260 in order to minimize reflection effects and errors during transmission.

The bus architecture illustrated in FIG. 2 and described above is used to connect outputs of access ports 210*a–c* with inputs on PPE 220*a–c*. However, access ports 210*a–c* and PPE 220*a–c* are bi-directional devices. As stated above, ATM data is received from ATM backbone network 101, processed in PPE 220*a–c* to convert the ATM data back to the suitable protocol, and then transmitted to access ports 210*a–c*. The transfers of data from the outputs of PPE 220*a–c* to inputs on access ports 210*a–c* is performed by means of a "reverse direction" bus architecture similar to the one depicted in FIG. 2 and described above. That is, one output on each of PPE 220*a–c* is connected by means of a T3 bus line in a 1:N (single source/multidrop) configuration to an input on every one of the access ports 210*a–c*. In one embodiment of the invention, the 1:N bus lines on each output of PPE 220*a–c* are actually dual serial T3 lines, thereby providing twice DS3 capacity. This is done because the output bit rates of the protocol processing engines 220a–c are frequently higher than the output bit rates of the access ports 210a–c. This is because each of PPE 220a–c generally has the capacity to service a plurality of access ports 210a–c. Therefore, the reverse direction bus architecture uses dual serial T3 lines. The reverse direction bus architecture is not shown in FIG. 2 for the purposes of simplicity and clarity in describing the "forward direction" bus architecture shown in FIG. 2 and because the depiction and detailed description of the reverse direction bus architecture would be redundant and unnecessary.

Figure 3:
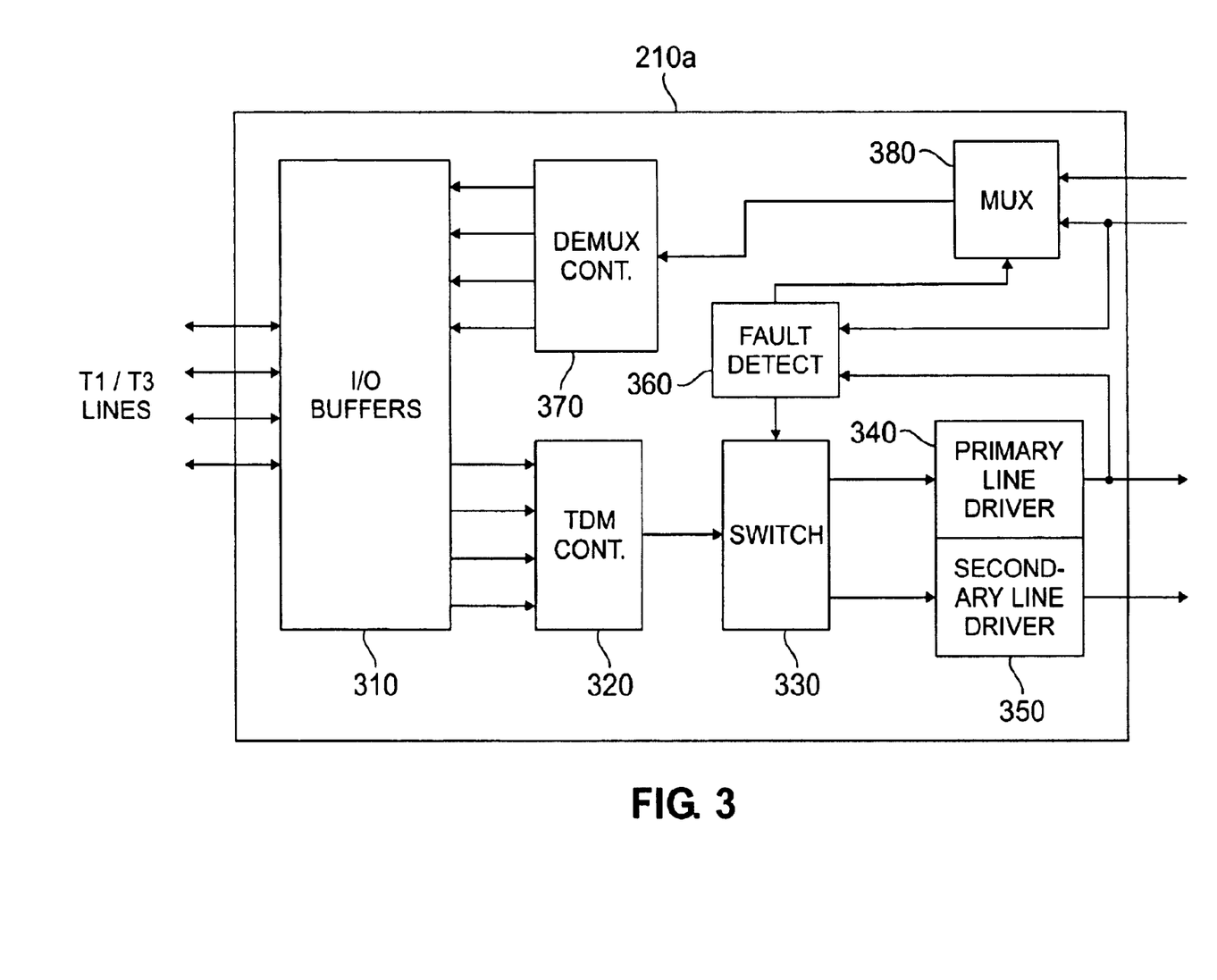
FIG. 3 illustrates in greater detail the exemplary access port within the access concentrator in FIG. 2 in accordance with one embodiment of the present invention.
Figure 4:
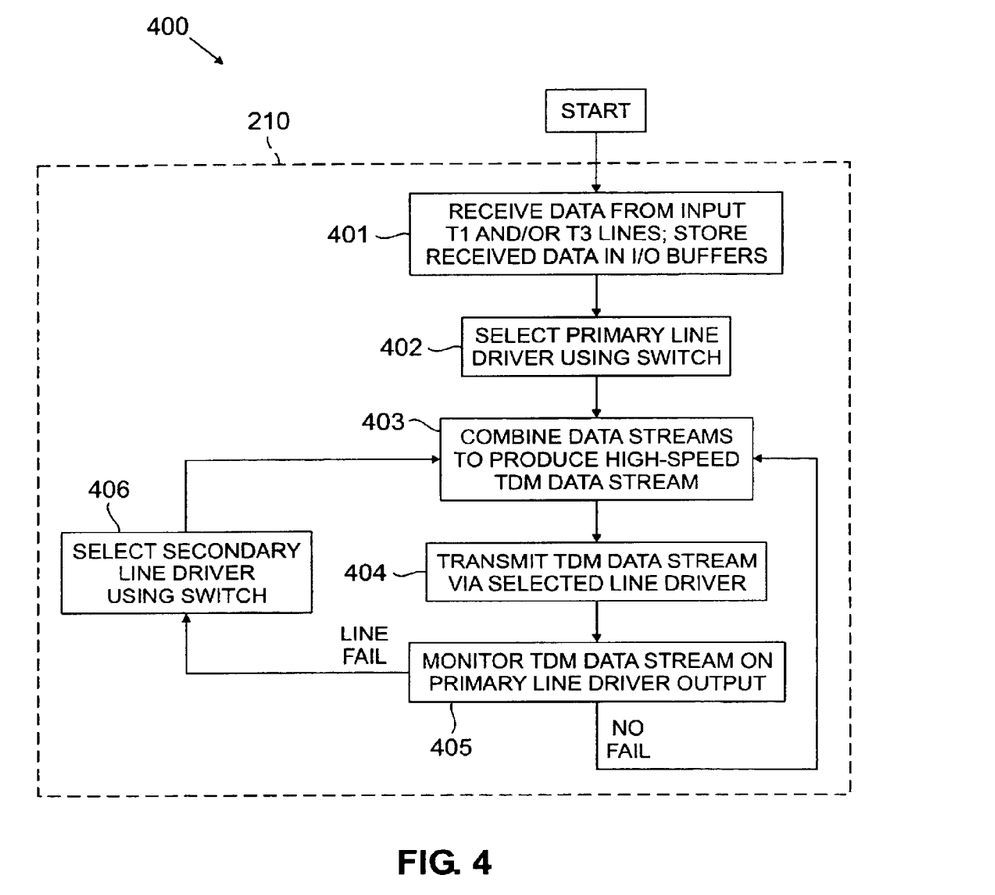
FIG. 4 is a flow diagram illustrating the operation of the exemplary access port shown in FIG. 4 in accordance with one embodiment of the present invention.

FIG. 3 illustrates in greater detail an exemplary access port 210 within exemplary access concentrator 130 in accordance with one embodiment of the present invention. Access port 210 comprises I/O buffers 310, time division multiplex controller (TDM) 320, switch 330, and primary line driver 340. Access port 210 also comprises secondary line driver 350, fault detector 340, demultiplexing controller 370, and multiplexer 380. FIG. 4 is a flow diagram 400 illustrating the operation of exemplary access port 210 in accordance with one embodiment of the present invention.

Under normal operation, data is received from input T1 and/or T3 lines and stored in I/O buffers 310 (process step 401). Switch 303 is set to direct all output TDM data streams to primary line driver 340, which drives the 1:N bus line connected to protocol processing engines 220a–c (process step 402). Data is read from I/O buffers 310 by time division multiplexing (TDM) controller 320 and multiplexed together to produce a high-speed TDM data stream at the output of TDM controller 320 (process step 403). In an exemplary embodiment of the present invention, the output of TDM controller 320 is the equivalent of a DS3 signal (i.e., 45 Mbps).

The TDM data stream is directed through switch 330 and primary line driver 340 and transmitted across the 1:N bus line to protocol processing engines 220a–c (process step 404). Fault detection circuit 360 monitors the output of primary line driver 340 in order to determine whether primary line driver 340 is correctly transmitting data (process step 405). Fault detection circuit 360 comprises appropriate clock circuits and counters to verify whether or not a DS3 signal appears at the output of primary line driver 340. If a line failure occurs such that the output of primary line driver 340 is stuck at Logic 1 level or stuck at Logic 0 level, fault detection circuit 360 selects secondary line driver 350 using switch 330 (process step 406). Thereafter, data streams received from TDM controller 320 are directed through switch 330 to secondary line driver 350, which is connected to the multisource/multidrop backup bus line 260. If no failure is detected, the TDM data streams produced by TDM controller 320 continue to be directed through switch 330 to primary line driver 340.

In the reverse direction, ATM data received from ATM backbone network 101 and converted to the appropriate protocol by PPE 220a–c is transmitted by the above-described reverse direction bus architecture to access port 210. Access port 210 can receive signals from the reverse direction bus architecture on a primary 1:N (single source/multidrop) bus line or on a backup M:N (multisource/multidrop) bus line, depending on the switch position of multiplexer 380. The primary 1:N line from the reverse direction bus architecture is monitored by fault detector 360, which switches multiplexer 380 to the backup M:N bus if a failure occurs on the primary 1:N bus line.

The output of multiplexer 380 is directed to demultiplexing controller 370. Demultiplexing controller 370 separates the individual data streams in the high speed DS3 signal received from the reverse direction bus architecture and stores them in I/O buffers 310. The individual data streams are then transmitted out of I/O buffers 310 on the appropriate T1 and/or T3 lines.

Although the present invention has been described in detail, those skilled in the art should understand that they can make various changes, substitutions and alterations herein without departing from the spirit and scope of the invention in its broadest form.

What is claimed is:

1. For use in a data communications device, a data transfer system comprising:

M signal source drivers, wherein each of said M signal source drivers comprises a primary output capable of transmitting data and a secondary output capable of transmitting data;

N signal receivers, wherein each of said N signal receivers has M primary inputs capable of receiving data and one secondary input capable of receiving data;

an interconnection bus comprising M bus lines, wherein each of said M bus lines is coupled to and driven by one of said primary outputs on one of said M signal source drivers and wherein each of said M bus lines is coupled to and drives one of said M primary inputs on each of said N signal receivers; and an alternate bus line that connects all of said secondary outputs on said M signal source drivers to each other and to each secondary inputs on said N signal receivers, wherein said data communications device comprises a concentrator capable of receiving a plurality of data signals from a plurality of external devices and each of said M signal source drivers combines selected ones of said plurality of data signals to produce a combined signal having a higher bit rate than said selected data signals.

2. The data transfer system set forth in claim 1, wherein each of said M signal source drivers normally transmits a data stream from said primary output.

3. The data transfer system set forth in claim 2, wherein each of said M signal source drivers transmits said data stream from said secondary output upon a failure of said primary output.

4. The data transfer system set forth in claim 1, wherein said data signals are time division multiplex (TDM) signals.

5. The data transfer system set forth in claim 1, wherein said each of said M signal source drivers plurality of data signals combines said selected ones of said plurality of data signals using time division multiplexing techniques.

6. A signal concentrator comprising:

a plurality of input buffer devices, each of said plurality of input buffer devices capable of receiving and storing a plurality of input data signals;

a plurality of signal combiners, each of said plurality of signal combiners capable of combining selected ones of said plurality of input data signals into a composite data signal;

a plurality of signal drivers; each of said plurality of signal drivers coupled to one of said plurality of signal combiners receiving said composite data signal therefrom, wherein said each signal driver transmits said composite data signal from a primary output;

a plurality of signal receivers capable of receiving from said each of said plurality of signal drivers said transmitted composite data signal;

an interconnection bus comprising a plurality of bus lines, each of said plurality of bus lines coupled to one selected primary output of only one of said signal drivers and coupled to signal inputs on selected ones of said plurality of signal receivers; and an alternate bus line connecting a secondary output of each of said plurality of signal drivers to inputs on each of said plurality of signal receivers.

7. The signal concentrator set forth in claim 6 wherein said each of said plurality of signal drivers normally transmits said composite data signal from said primary output.

8. The signal concentrator set forth in claim 7 wherein said each of said plurality of signal drivers transmits said composite data signal from said secondary output upon a failure of said primary output.

9. The signal concentrator set forth in claim 6 wherein said selected ones of said plurality of signal receivers comprise all of said plurality of signal receivers.

10. The signal concentrator set forth in claim 6 wherein said composite data signal is time division multiplex (TDM) signal.

11. The signal concentrator set forth in claim 6 wherein said composite data signal has a higher bit rate than said input data signals.

12. A signal concentrator comprising:

a plurality of input buffer devices, each of said plurality of input buffer devices capable of receiving and storing a plurality of input data signals;

a plurality of signal combiners, each of said plurality of signal combiners capable of combining selected ones of said plurality of input data signals into a composite data signal;

a plurality of signal drivers; each of said plurality of signal drivers coupled to one of said plurality of signal combiners receiving said composite data signal therefrom, wherein said each signal driver transmits said composite data signal from a primary output;

a plurality of signal receivers capable of receiving from said each of said plurality of signal drivers said transmitted composite data signal;

an interconnection bus comprising (i) a plurality of bus lines, each of said plurality of bus lines coupled to one selected primary output of only one of said signal drivers and coupled to signal inputs on selected ones of said plurality of signal receivers, and (ii) an alternate bus line connecting a secondary output of each of said plurality of signal drivers to inputs on each of said plurality of signal receivers.

13. The signal concentrator set forth in claim 12 wherein said each of said plurality of signal drivers normally transmits said composite data signal from said primary output.

14. The signal concentrator set forth in claim 13 wherein said each of said plurality of signal drivers transmits said composite data signal from said secondary output upon a failure of said primary output.

15. The signal concentrator set forth in claim 12 wherein said selected ones of said plurality of signal receivers comprise all of said plurality of signal receivers.

16. The signal concentrator set forth in claim 12 wherein said composite data signal is time division multiplex (TDM) signal.

17. The signal concentrator set forth in claim 12 wherein said composite data signal has a higher bit rate than said input data signals.

* * * * *

UNITED STATES PATENT AND TRADEMARK OFFICE
CERTIFICATE OF CORRECTION

PATENT NO. : 6,757,244 B1  Page 1 of 1
DATED : June 29, 2004
INVENTOR(S) : Mark D. Redman It is certified that error appears in the above-identified patent and that said Letters Patent is hereby corrected as shown below:

Column 8,
Line 29, delete "inputs" and replace with -- input --.

Signed and Sealed this

Thirty-first Day of January, 2006

JON W. DUDAS
*Director of the United States Patent and Trademark Office*